H. PIEPER.
PROPULSION OF MOTOR VEHICLES.
APPLICATION FILED JAN. 23, 1911.
1,026,827.
Patented May 21, 1912.
2 SHEETS—SHEET 1.
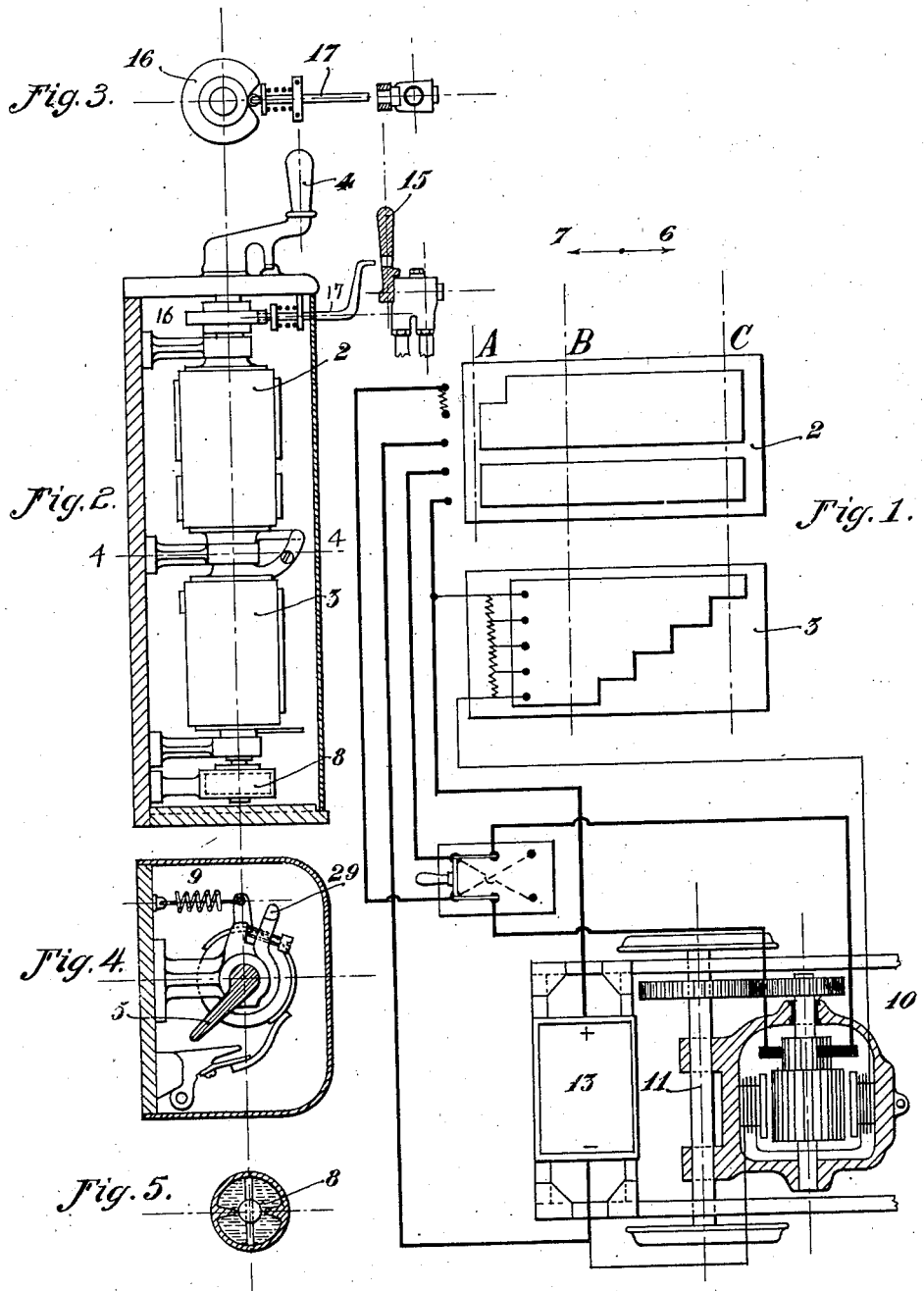

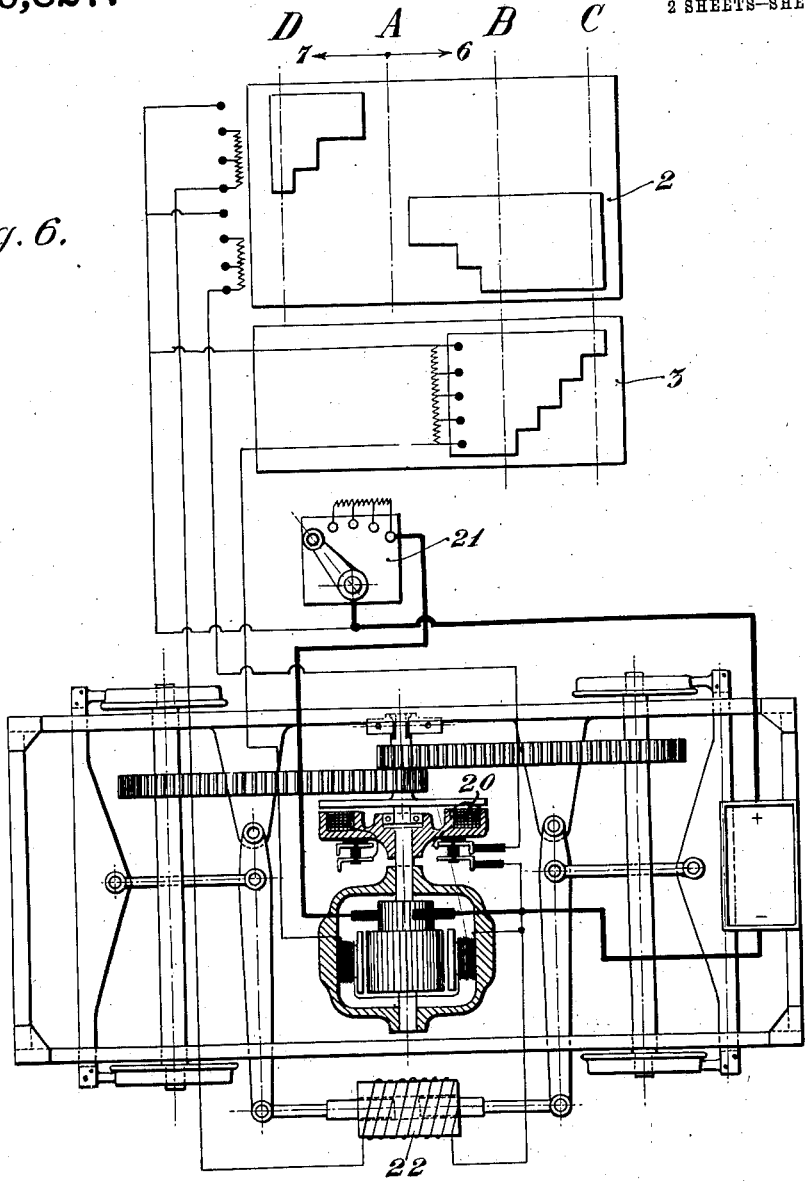

UNITED STATES PATENT OFFICE.

HENRI PIEPER, OF LIEGE, BELGIUM.

PROPULSION OF MOTOR-VEHICLES.

1,026,827.  Specification of Letters Patent.  Patented May 21, 1912.

Application filed January 23, 1911. Serial No. 604,225.

*To all whom it may concern:*

Be it known that I, HENRI PIEPER, subject of the King of Belgium, residing at Liege, Belgium, have invented certain new and useful Improvements in or Relating to the Propulsion of Motor-Vehicles; and I do hereby declare the following to be a full, clear, and exact description of the invention, such as will enable others skilled in the art to which it appertains to make and use the same.

This invention relates to power driven vehicles which are self contained, that is, which have no external source of power supply, and has particular utility when applied to those arrangements employing an electric motor and storage battery and in which a recharging of the storage battery can take place at such times as the motors are driven as generators by the movement of the vehicle.

The invention is applicable either to systems in which a storage battery alone is employed, or in which a battery is used in connection with a generator driven by an internal combustion engine, or other suitable type of thermal motor. The recharging of the batteries in these systems takes place when the vehicle is coasting or running down hill by virtue of its own momentum or weight, and thus driving the motors as generators. The recharging current also acts a dynamic brake on the motors, and thus assists the ordinary friction brakes in retarding the movement of the vehicle. The simplest arrangement for recharging of this character consists in employing shunt motors, since these become generators just as soon as their terminal voltage exceeds that of the battery. This rise in voltage may be due either to an increase above normal speed or to a strengthening of the fields.

The object of the present invention is the provision of an improved controller which, while being manipulated to govern the supply of driving power to the wheels of the vehicle, at the same time automatically regulates the strength of the shunt field of the motor or motors. This regulation consists in progressively weakening the field to increase the speed of the machines when acting as motors, and in similarly increasing the field strength of the machines so as to give them the proper voltage, when acting as generators.

The mechanism and method of connecting the same will be apparent from an inspection of the accompanying drawings, in which, Figure 1 is a diagrammatic view showing my improved controller as applied to an ordinary electrically driven car employing a storage battery and shunt motor; Fig. 2 is an elevation of the controller, the inclosing casing being shown in section, and a portion of the control devices of an air brake system; Fig. 3 is a plan view of the means provided for preventing operation of the brake lever when the controller is moved from its "off" position; Fig. 4 is a horizontal sectional view through the controller, on the line 4—4 of Fig. 2; Fig. 5 is a similar view through the dash pot provided at the lower end of the controller; Fig. 6 is a diagrammatic view showing a slightly different form of controller, and illustrating a car equipped with electric brakes, and employing driven mechanism including a magnetic clutch.

In the diagram of Fig. 1, A represents the normal or "off" position of the controller. As the handle is moved so as to shift the drum from A to B, the contact strips on the part 2 engage suitable contact fingers in such a manner as to connect the motor armature with the storage battery, first through a starting resistance, and then direct. Meanwhile, it will be noted, all of the resistance in the shunt field circuit is short circuited by the contact strip of part 3. During this movement both parts of the drum 2 and 3 move together. Upon further movement in the same direction from B to C as indicated by the arrow 6, the sections of resistance are gradually cut into the shunt field circuit by the part 3 of the controller, thus weakening the field, while the armature connections remain unchanged. The motor therefore speeds up. The dash pot 8, however, prevents the operator from increasing the speed too rapidly. If the operator now moves the controller handle so as to rotate the drum from the position C toward A, (as indicated by arrow 7) slowly, the part 3 will move with the part 2, and the resistance be gradually cut out of the shunt field circuit. If, however, owing to an emergency, it becomes necessary for the operator to throw the handle suddenly so as to quickly move the part 2 from the position C to position A, thus opening the armature circuit of the motor, the dash pot 8 will prevent the part 3 from returning so quickly, but will allow it to move back slowly under the influence of the spring 9, thus cutting the resistance out slowly step by step, and preventing the excessive dynamic or recharging currents which would flow during reverse movement of the controller section 2 were the full field strength instantly restored when the machine was running at high speed.

Naturally the generation of current is only possible to a practical extent when the motorman moves the handle slowly from the position C to the position B. In case of a quick return of the handle, if the two sections of the controller are rigidly connected to the handle in the ordinary way, the field of the dynamo changes quickly from a minimum, (position C) to a maximum (position B), and consequently the voltage of the dynamo becomes many times that of the battery, the speed of the armature remaining practically a maximum during the quick movement from C to B. There would then be produced an excessively great charging current which would destroy both the battery and the armature, although it might only last for a short time, on account of the armature circuit being broken, which happens at the position A. It is absolutely necessary, therefore, to avoid so great an increase in the charging current; this result is obtained, according to the invention, by virtue of the fact that the drum 3 controlling the field of the dynamo, is independent of the handle during its return movement. Such movement being made at slow speed has the effect that during the part C—B of the rapid return of the handle, the field as well as the speed will be but slightly different from their value in the position C (maximum speed, minimum field). The recharging current therefore cannot assume a dangerous value.

Referring to Figs. 1 to 5 inclusive, it will be seen that my improved controller drum comprises two parts 2 and 3, the part 2 being rigidly connected with the usual handle 4. The part 3 is disconnected from the part 2 and is adapted to be turned thereby through the medium of a finger 5, carried by the part 2, engaging a projection 29 carried by the part 3. A spring 9 serves to automatically return the part 3 to normal position when released, and a dash pot 8 serves to retard the movement of the drum 3 in both directions. 10 represents the motor, which is geared to the axle 11 in the usual manner. 13 indicates the storage battery which supplies current to the motor. 15 represents the handle of the engineer's valve of any suitable air brake system. This handle has an opening therethrough into which a locking bolt 17 is adapted to fit. This bolt is slidably mounted in the controller casing, and is provided on its inner end with an anti-friction roller which rides upon a cam 16 carried on the controller shaft. This cam has a notch into which the roller carried by the locking bolt is adapted to fit when the controller is moved to the "off" position. A coil spring normally tends to move the locking bolt to the retracted or inoperative position shown in the drawing. It will be obvious therefore that whenever the controller is moved from the "off" position, the cam 16 will serve to project the locking bolt 17 so that its outer end engages the opening in the brake lever 15, and thus locks it against operation. Therefore it is impossible for the brakes to be applied except when the controller is in "off" position.

In Fig. 6 I have shown another arrangement for accomplishing the same general result. In this arrangement I employ parts 2 and 3 of the controller as before, and similarly connect them, but the contact strips are differently arranged. In this figure I have shown the motor connected to the driving axles by means of a magnetic clutch 20. The motor may therefore be started and stopped independently of the axles, by means of an ordinary rheostat 21. 22 indicates a solenoid for operating the usual friction brakes. From an inspection of the circuits illustrated in Fig. 2 it will be seen that A represents the normal or "off" position of the controller. When moved from A to B in the direction of arrow 6, the drum 2 serves to progressively energize the circuit of the magnetic clutch 20 and thus govern the application of driving power to the wheels, while the part 3 produces no effect, the resistance in the shunt field being all short circuited. In moving from B to C, however, this resistance is gradually inserted thereby progressively increasing the speed of the motor. To stop the vehicle, the controller is moved back to position A thereby deenergizing the clutch and thus disconnecting the motor from the wheels, and upon a further movement of the controller from A to D in the direction of arrow 7, the circuit of electric-brake-magnet 22 is progressively energized, thereby applying the brakes. The brakes are released by bringing the controller back to the position A. It will be noted, however, that, as before, the brakes cannot be set as long as driving power is being applied to the wheels of the vehicle.

What I claim is:—

1. In an electrically propelled vehicle, a shunt wound motor for driving the same, means for controlling the application of driving power to the wheels of the vehicle, means for progressively weakening the shunt field of the motor to increase the speed, and means for automatically restoring the full strength of such field when the wheels are entirely deprived of driving power.

2. In an electrically propelled vehicle, a shunt wound motor for driving the same, a controller for governing the application of driving power to the wheels of the vehicle, said controller also comprising means for progressively weakening the shunt field of the motor to increase the speed, means for automatically restoring the full strength of such field when the controller is moved to "off" position, and the wheels thereby entirely deprived of driving power, friction brakes for the said wheels, and means associated with said controller for preventing the setting of the brakes except when the wheels are free from driving power.

3. In an electrically propelled vehicle, a shunt wound motor for driving the same, a storage battery for supplying current to said motor, means for controlling the application of driving power to the wheels of the vehicle, means for progressively weakening the shunt field of the motor to increase the speed, and means for automatically restoring the full strength of said field, whereby, when the vehicle is coasting, the voltage of the motor acting as a generator will be sufficient to recharge said battery.

4. In an electrically propelled vehicle, a shunt wound motor for driving the same, a controller consisting of two parts, one part serving to govern the application of driving power to the wheels of the vehicle, and the other serving to regulate the strength of the shunt field of said motor, a connection between said parts whereby they move together in one direction but are capable of independent movement in the other direction, and means for retarding the movement of one of said parts.

5. In an electrically propelled vehicle, a shunt wound motor for driving the same, a controller consisting of two parts, one part serving to govern the application of driving power to the wheels of the vehicle and the other part serving to regulate the strength of the shunt field of said motor, a connection between said parts whereby they move together in one direction but whereby the first mentioned part may move independent of the other in the opposite direction, means for automatically restoring the last mentioned part to normal position when disengaged from the first part, and means for retarding the movement of said second part in both directions.

In testimony whereof I affix my signature in presence of two witnesses.

HENRI PIEPER.

Witnesses:
  VICTOR HAMAL,
  L. BERCK.